June 6, 1944.  T. ULRICH  2,350,430
WINDOW MOLDING
Filed Aug. 29, 1941
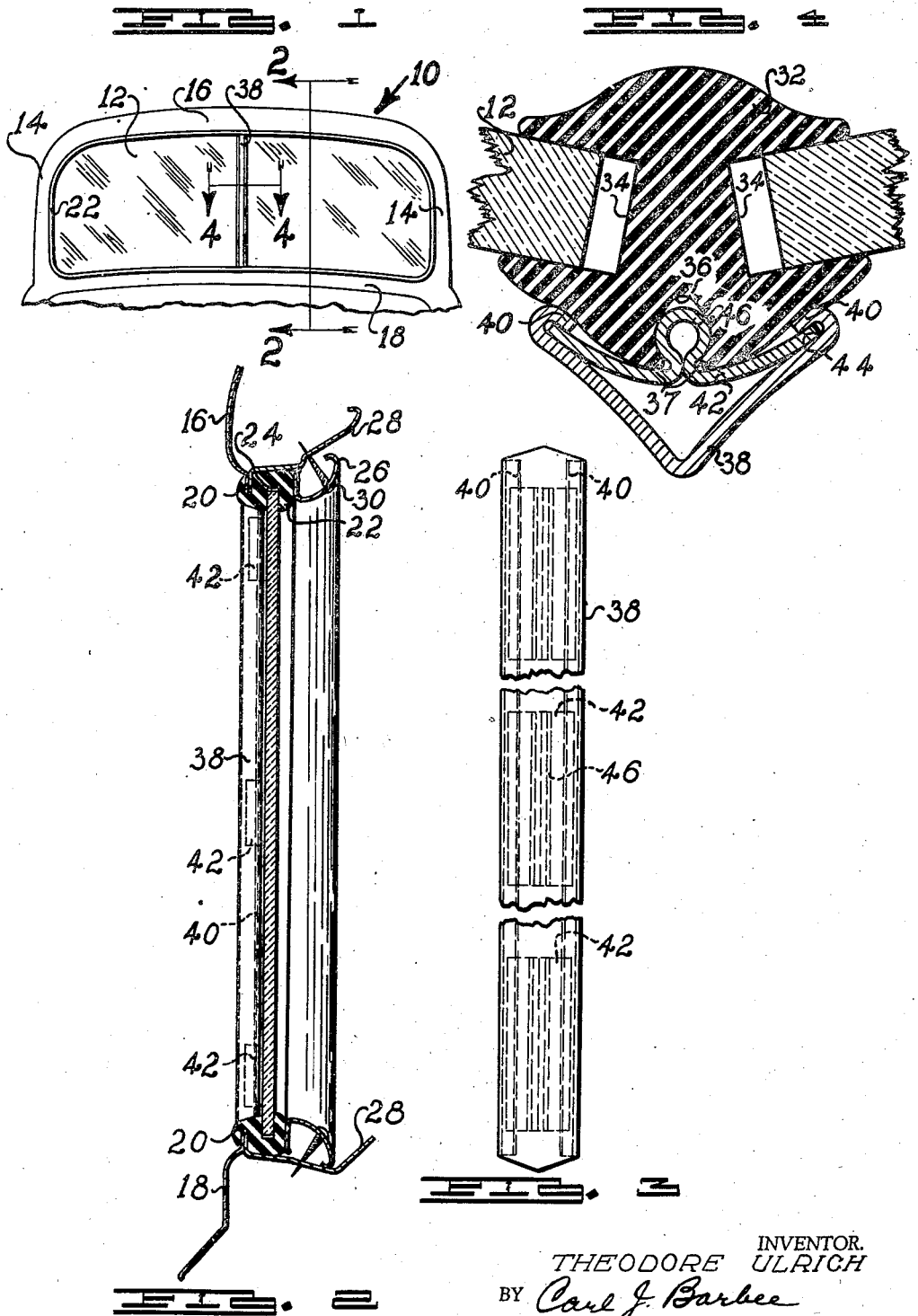
INVENTOR.
THEODORE ULRICH
BY Carl J. Barbee Patented June 6, 1944

2,350,430

UNITED STATES PATENT OFFICE 2,350,430

WINDOW MOLDING

Theodore Ulrich, Milwaukee, Wis., assignor to Nash-Kelvinator Corporation, Kenosha, Wis., a corporation of Maryland Application August 29, 1941, Serial No. 408,769

5 Claims. (Cl. 296—84)

This invention relates to window molding and has particular reference to means for attaching a trim strip to the molding of an automobile windshield.

It is an object of this invention to provide a windshield molding to which a trim strip may be easily and quickly attached.

It is another object of this invention to provide a windshield molding which will function properly and be of pleasing appearance either with or without a trim strip attached thereto.

It is another object of this invention to provide a trim strip which may be easily and quickly attached to a windshield molding without the use of tools.

It is another object of this invention to provide a windshield molding and trim strip which will cooperate to tighten the joint between the molding and the windshield.

Other objects and advantages of this invention will be apparent from a consideration of the following description and claims and the attached drawing, of which there is one sheet, and in which—

Figure 1 represents a front elevation of an automotive windshield;

Figure 2 represents a sectional view taken along a plane indicated by the line 2—2 in Figure 1 and looking in the direction of the arrows;

Figure 3 represents a front elevation of the trim strip shown in Figures 1 and 2; and Figure 4 represents a sectional view taken along a plane indicated by the line 4—4 in Figure 1 and looking in the direction of the arrows.

Figure 1 illustrates the front of an automobile 10 having a divided windshield 12 of the V type bounded by corner posts 14, a top 16 and cowl 18. As is most clearly illustrated in Figure 2, the members which bound the windshield are provided with flanges 20 which project inwardly toward the center of the windshield opening and over which is positioned a deformable rubber gasket 22. The gasket 22 is provided with an external groove which fits over the flanges 20 and with an internal groove 24 which receives the outer edges of the windshield 12. The edges of the windshield 12 and the gasket 22 may be clamped tightly against the flanges 20 by means of a metal trim molding 26 secured to interior body members 28 by the screws 30.

The joint between the adjacent edges of the two parts of the windshield is most clearly shown in Figure 4 and consists of a rubber dividing strip 32 having grooves 34 formed along each side thereof and within which the adjacent edges of the windshield 12 are received. The ends of the dividing strip 32 may be secured as by vulcanizing or bonding to the rubber molding strip 22 which extends around the outer edges of the windshield.

The forward surface of the dividing strip 32 is provided with a groove 36 which is narrower at the surface of the strip than within the body of the strip so as to form overhanging edges 37, the function of which will be described presently.

Secured to the forward surface of the dividing strip 32 is a trim strip 38 having a generally V-shaped cross section with return flanges 40 formed along the edges thereof. The trim strip 38 is preferably made with a chromium or other highly polished surface to enhance the appearance of the automobile.

Extending between the return flanges 40 on the trim strip 38 and positioned generally within the V-shaped cross section of the trim strip is a series of bowed clips 42 which have their ends 44 tightly secured between the forward portion of the trim strip and the return flanges 40. The center of the clips 42 is provided with a generally cylindrical bend 46 which is arranged to be pressed into the elliptical groove 36 in the forward surface of the dividing strip 32. The diameter of the cylindrical bend 46 is greater than the width of the open edge of the groove 36 so that when the bent portion is forced into the groove, the edges of the groove will tightly grip the cylindrical portions of the clips and support the clips and trim strip on the divider strip. The expansion of the divider strip caused by forcing the cylindrical portions 46 into the groove 36 also acts to compress the divider strip more tightly against the edges of the windshield 10, thus making a tighter joint between the windshield and the divider strip.

The surface of the divider strip 32 which defines the groove 36 is generally convex while the back side of the trim strip is generally concave so that the two strips nest together. Thus the trim strip does not project too far forward from the divider strip. The bowed clips 42 are positioned within the concave face of the trim strip so as to permit the nested relationship of the two strips.

It will be noted that the trim strip 38 may be installed on the divider strip 32 by simply pressing the cylindrical bend portions 46 into the groove 36 so that no tools are required to make the installation. It will also be apparent that the groove 36 in the forward face of the divider strip 32 does not detract from the appearance of the divider strip so that the trim strip 38 may be omitted without leaving unsightly marks on the divider strip 32. It is thus possible for a manufacturer of automobiles to utilize a single divider strip for cars, some of which are provided with a trim strip and some of which are not.

The trim strip is disclosed as being applied to only the divider strip of the windshield molding but obviously the same principle may be employed to mount a trim strip completely around the windshield or on any joint connecting two relatively thin members. While I have described my invention in some detail, I intend this description to be an example only and not as a limitation of my invention, to which I make the following claims.

I claim.

1. A windshield divider comprising a deformable unitary divider strip arranged to be sealed between the edges of a windshield and defining oppositely presented lateral grooves and a groove in the forward surface thereof, a two-part continuous trim strip comprising an exposed part V-shaped in cross-section and having return flanges formed along the edges thereof, a clip extending longitudinally of said strip and having its edges retained between said strip and said return flanges, and a projection formed in the rearwardly presented surface of said clip and positioned within said groove to fill said groove, expand said divider strip and support said trim strip on said divider strip, said return flanges lying in contact with the forwardly presented surface of said divider strip.

2. A windshield divider comprising a deformable divider strip having a convex forwardly-presented surface defining a groove with overhanging edges, another groove formed in said deformable strip positioned over the edge of said windshield, a trim strip having a generally concave surface presented toward and positioned over and in contact with the convex surface of said flexible strip, and a bead formed centrally of the concave surface of said trim strip positioned in said first groove, the remainder of said trim strip overlying the edges of said first groove and concealing the same.

3. A windshield divider comprising a unitary deformable divider strip having a convex surface defining a groove with overhanging edges, another groove formed in said deformable strip positioned over the edge of the windshield, a trim strip having a generally concave surface presented toward and positioned over the convex surface of said flexible strip, and a cylindrical bead extending longitudinally of said strip and formed centrally of the concave surface of said trim strip positioned within the concave portion of said trim strip and gripped between overhanging edges of said groove, the remainder of said trim strip overlying the edges of said first groove and concealing the same.

4. A windshield divider comprising a deformable divider strip arranged to seal the space between the edges of a windshield and defining a groove having overhanging edges in the forward surface of said divider strip, a trim strip having a generally concave surface presented toward said divider strip and overlying said groove, return flanges formed on the edges of said trim strip, bowed clips having their edges retained by said return flanges, and cylindrical bends formed between the ends of said clips and generally between the edges of said trim strip, said cylindrical bends being positioned in said groove in said divider strip.

5. A windshield divider comprising a deformable divider strip having lateral surfaces provided with grooves receiving the edges of windshields, a convex surface formed upon the forward portion of said strip and having a forwardly opening groove therein, and a composite trim strip having a groove-filling portion and an exterior finishing portion, said groove-filling portion comprising a bead running lengthwise of the strip and formed as a projection from a concave surface, said bead being received in the forwardly opening groove, the edge portions of said concave surface being received within and embraced and retained by return flanges forming the edges of said finishing portion, and said return flanges lying in contact with the convex surface of said divider strip.

THEODORE ULRICH.